(12) United States Patent
Bidigare et al.

(10) Patent No.: US 10,716,442 B2
(45) Date of Patent: Jul. 21, 2020

(54) CLEANING TOOL FOR VEHICLE EXHAUST AFTERTREATMENT DEVICE AND METHOD OF USING SAME

(71) Applicant: IDSC Holdings, LLC, Kenosha, WI (US)

(72) Inventors: Jeffrey M. Bidigare, St. Clair Shores, MI (US); Todd W. Crowley, Livonia, MI (US); Christian P. Greene, Rochester Hills, MI (US); David F. Skladanowski, Washington, MI (US); David P. Shock, Clinton Township, MI (US)

(73) Assignee: IDSC Holdings, LLC, Kenosha, WI (US)

( * ) Notice: Subject to any disclaimer, the term of this patent is extended or adjusted under 35 U.S.C. 154(b) by 337 days.

(21) Appl. No.: 15/681,201

(22) Filed: Aug. 18, 2017

(65) Prior Publication Data
US 2019/0053677 A1 Feb. 21, 2019

(51) Int. Cl.
*A47L 9/02* (2006.01)
*F01N 3/023* (2006.01)
(Continued)

(52) U.S. Cl.
CPC ............... *A47L 9/02* (2013.01); *F01N 3/021* (2013.01); *F01N 3/0232* (2013.01);
(Continued)

(58) Field of Classification Search
CPC ..... A47L 9/02; A47L 5/32; A47L 9/24; A47L 9/242; F01N 2450/04; F01N 3/021;
(Continued)

(56) References Cited

U.S. PATENT DOCUMENTS

| | | | |
|---|---|---|---|
| 3,668,736 A * | 6/1972 | Loscalzo | A47L 9/06 15/402 |
| 4,136,869 A * | 1/1979 | Tassone | A63B 69/0075 473/417 |

(Continued)

FOREIGN PATENT DOCUMENTS

WO 2012/059901 A2 5/2012

OTHER PUBLICATIONS

Catalytic Exhaust Products Ltd., Diesel Particulate Filters at Great Prices!, brochure downloaded Jul. 24, 2017 from the world wide web at https://www.catalyticexhaust.com/product/diesel-particulate-filters/maintenance-filters (3 pages).
(Continued)

*Primary Examiner* — Brian D Keller
(74) *Attorney, Agent, or Firm* — McDonnell Boehnen Hulbert & Berghoff LLP

(57) ABSTRACT

A cleaning tool for an aftertreatment device including a vacuum attachment port having an exterior end and an interior end, a vacuum extension extending from the interior end of the vacuum attachment port, wherein the vacuum extension has a concave inner surface adapted to engage an end of the aftertreatment device, wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port.

24 Claims, 17 Drawing Sheets

(51) Int. Cl.
*F01N 3/021* (2006.01)
*F01N 3/20* (2006.01)
*F01N 3/10* (2006.01)

(52) U.S. Cl.
CPC ............ *F01N 3/0237* (2013.01); *F01N 3/103* (2013.01); *F01N 3/2093* (2013.01); *F01N 2260/04* (2013.01); *F01N 2450/04* (2013.01)

(58) Field of Classification Search
CPC ...... F01N 3/023; F01N 3/0232; F01N 3/0233; B01D 53/86; B01D 53/96; B08B 5/04; B08B 9/00; B08B 9/027; B08B 9/032; B08B 9/0321; B08B 9/0325; B08B 9/035; B08B 5/02
USPC ...... 15/246.2, 304, 314, 315, 415.1; 134/21, 134/22.18, 34, 37
See application file for complete search history.

(56) References Cited

U.S. PATENT DOCUMENTS

| | | | | |
|---|---|---|---|---|
| 5,079,796 | A | * | 1/1992 | Berfield .................... A47L 9/02 15/415.1 |
| 6,131,759 | A | * | 10/2000 | Young .................... B65D 33/02 220/495.11 |
| 6,341,631 | B1 | * | 1/2002 | Hobbs .................... B67C 11/04 141/335 |
| D564,656 | S | | 3/2008 | Matsutori et al. |
| D606,373 | S | * | 12/2009 | McCaffery ............. B67C 11/02 D7/700 |
| D738,169 | S | | 9/2015 | Weisenbach |
| 9,366,488 | B2 | | 6/2016 | Sanhaji |
| 2010/0183490 | A1 | | 7/2010 | Hoke et al. |
| 2010/0230920 | A1 | * | 9/2010 | Thibault ................. A47L 13/58 280/79.11 |
| 2012/0071981 | A1 | * | 3/2012 | Farley .................... A61F 2/447 623/17.16 |
| 2013/0192711 | A1 | * | 8/2013 | Sessler .................... B67C 11/02 141/1 |
| 2018/0125317 | A1 | * | 5/2018 | Lutz ........................ A47L 9/242 |

OTHER PUBLICATIONS

DES Blowout Box (FTM BB002), DPF Cleaning Equipment, brochure downloaded Nov. 22, 2017 from the world wide web at https://www.dpfpartsdirect.com/collections/cleaning-equipment/products/blowout-box-des-bb002 (2 pages).
Detroit Diesel Corporation, Detroit Service Information Bulletin, Diesel Oxidation Catalyst Air Cleaning, Feb. 23, 2016 (9 pages).
FSX Equipment Inc., Diesel Particulate Filter Cleaning Equipment, brochure (3 pages), Jun. 10, 2009.
Hands on Tools Mechanic & Body Shop Tools & Supplies, OTC 5286 Portable Diesel Particulate Filter DPF, brochure downloaded Nov. 22, 2017 from the world wide web at https://www.handsontools.com/OTC-5286-Portable-Diesel-Particulate-Filter-DPF-Cleaner_p_101531.html (3 pages).
Nett Technologies Inc., Diesel Oxidation Catalysts, Your diesel engine emission control just got easier!, brochure and specification sheets downloaded Jul. 24, 2017 from the world wide web at https://www.nettinc.com/wp-content/uploads/docs/diesel-oxidation-catalyst-brochure-DOC.pdf (2 pages).
DTC Tool Company, OTC Tools and SPX, OTC 5280 Diesel Particulate Filter Cleaner, brochure and specification sheets downloaded Nov. 22, 2017 from the world wide web at http://s7d9.scene7.com/is/content/GenuinePartsCompany/1437908pdf?$PDF$, 2010 (4 pages).
Consumer Propane Bottle and LPG Cylinder Parts—Propane 101, "Promoting Propane Safety Through Better Understanding", 2016, 2 pages.

* cited by examiner

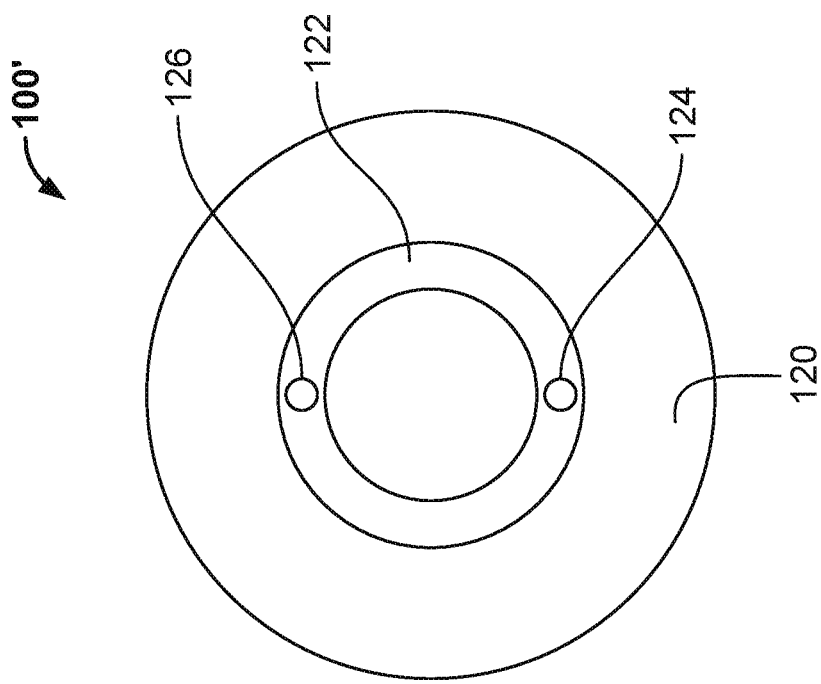
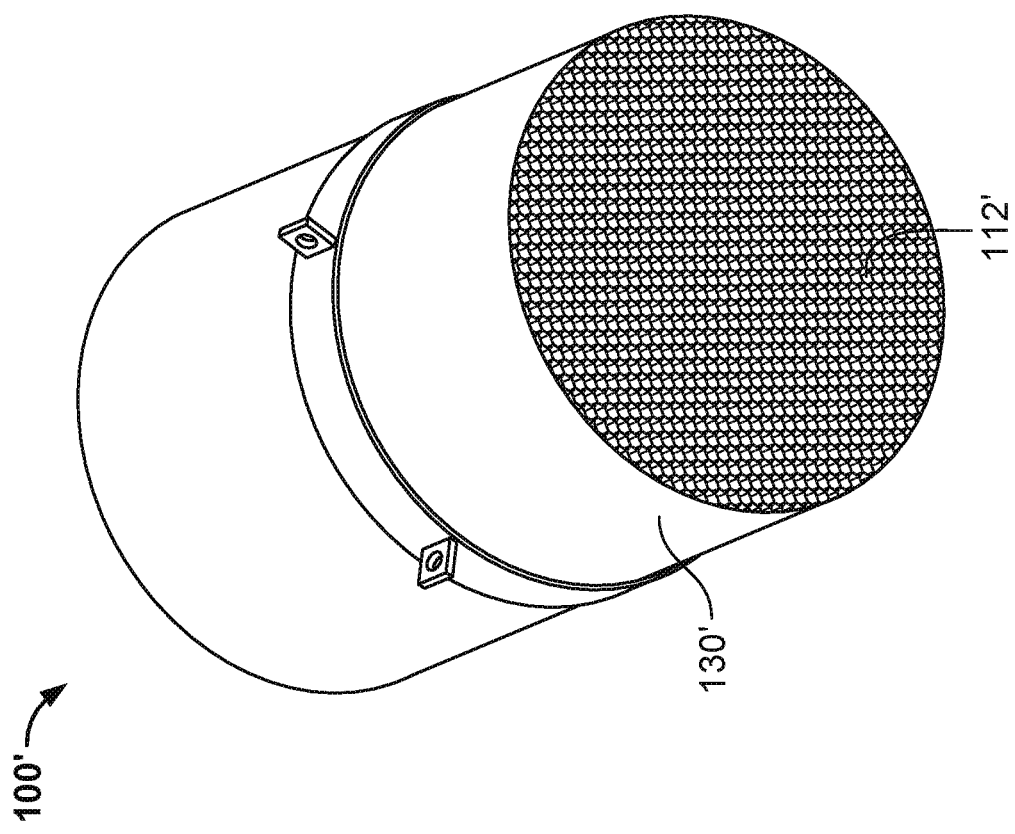
FIG. 4

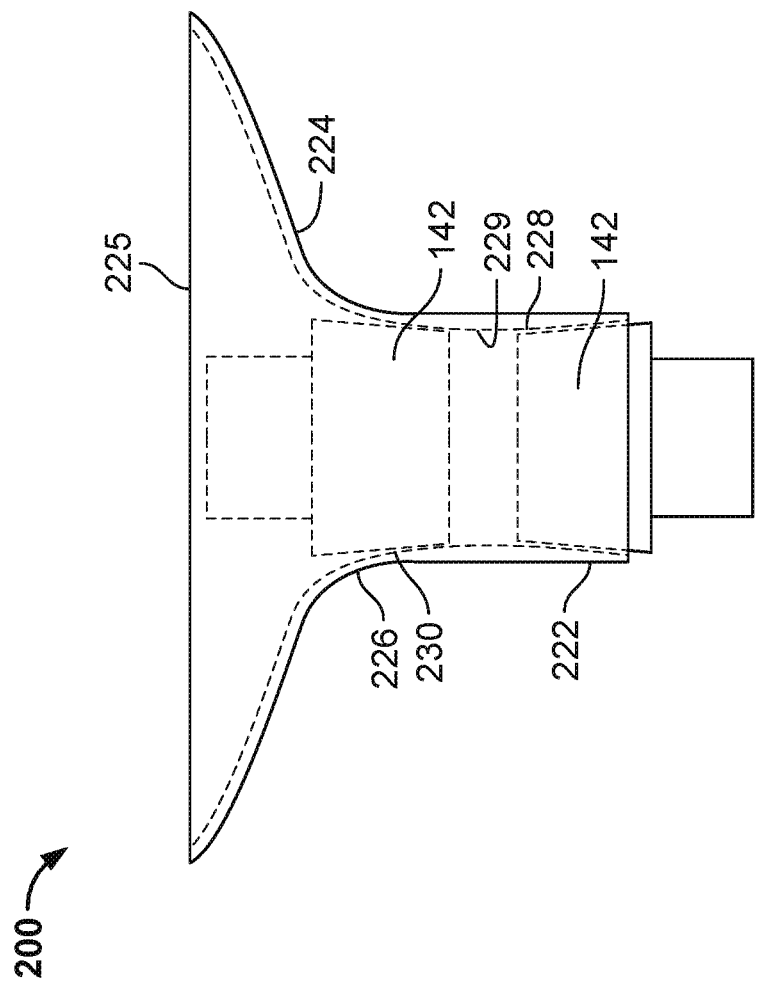
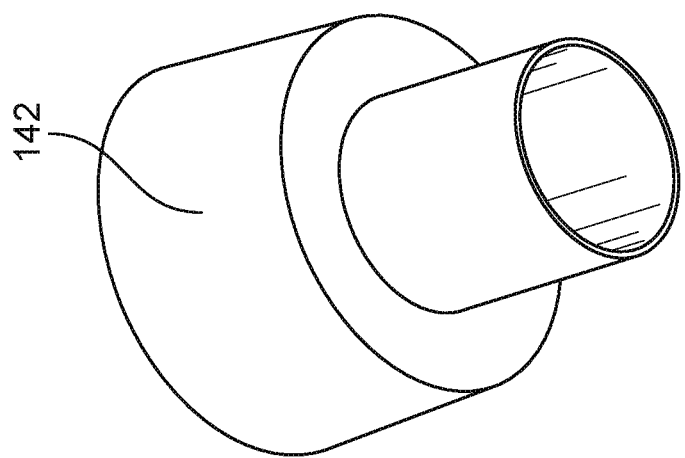
FIG. 11

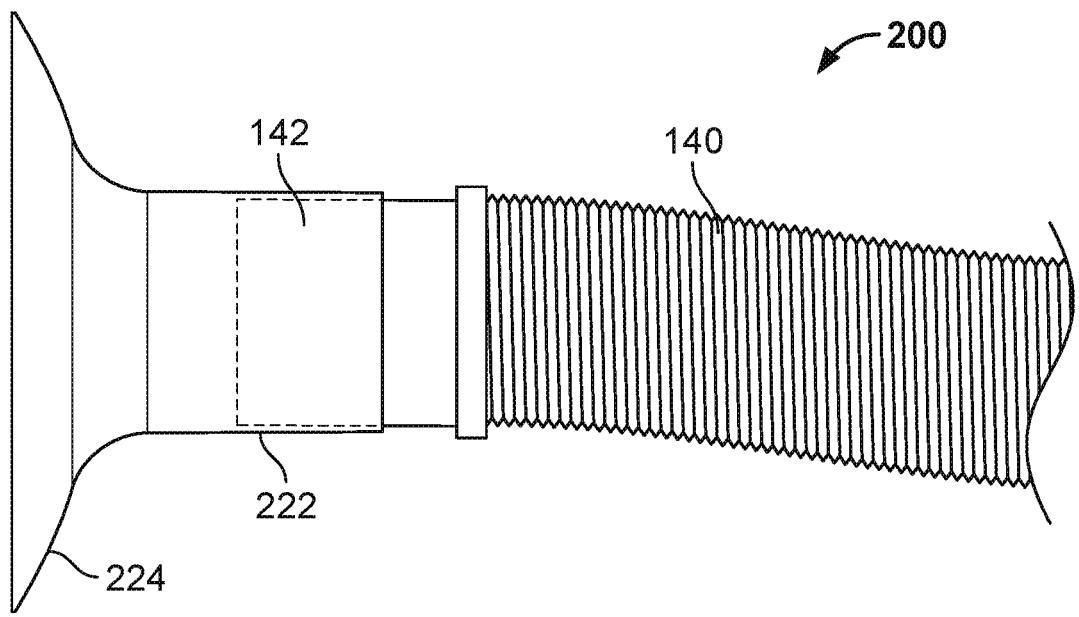
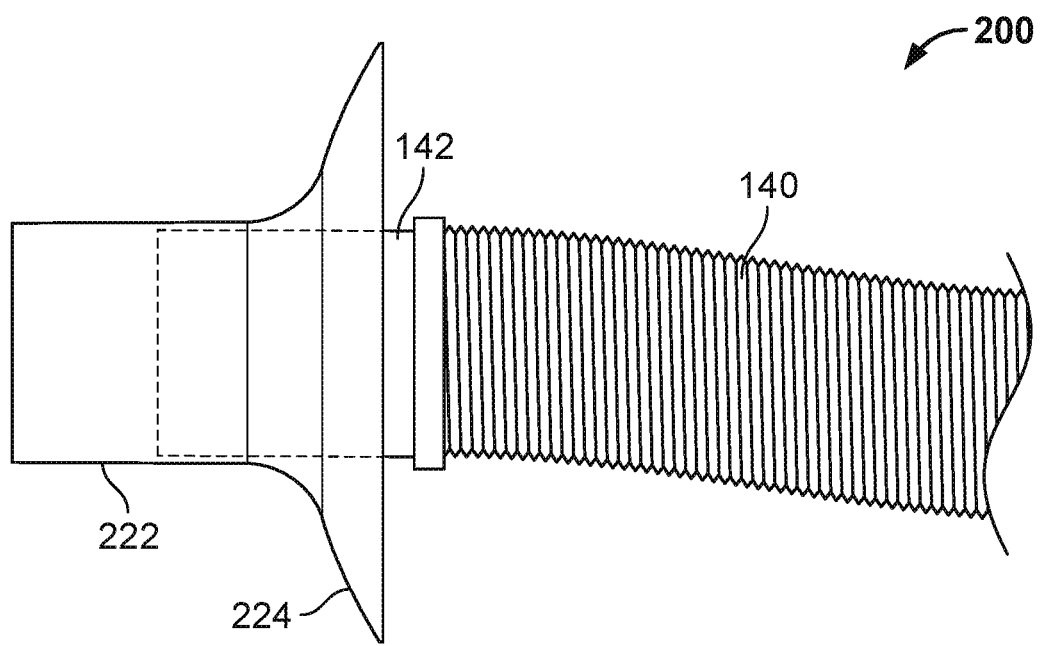
FIG. 12

CLEANING TOOL FOR VEHICLE EXHAUST AFTERTREATMENT DEVICE AND METHOD OF USING SAME

BACKGROUND

Vehicles having internal combustion engines, whether diesel or gasoline powered, emit exhaust gases. A number of devices may be used to treat the exhaust gases to produce $CO_2$ and $H_2O$ and to remove particulates from the exhaust gas, and are after treatment of exhaust devices, although in common usage in the industry they are referred to as aftertreatment devices. Such devices include a diesel oxidation catalyst (DOC), a diesel particulate filter (DPF), a selective catalyst reduction (SCR) filter, a catalytic converter, and other devices used to treat exhaust gases and particulates contained therein, hereinafter referred to collectively as "aftertreatment devices," referred to herein as ATDs.

Such after treatment devices may include a series of tubes having a honeycomb cross-section that is used to convert and collect the elements of the exhaust as soot or ash. Over time, the aftertreatment device accumulates the ash or soot and needs to be cleaned. Past methods of cleaning aftertreatment devices include submerging the device in a solvent and then forcing water through the honeycomb tubes to effect a cleaning operation. In addition, directing a flow of air through the honeycomb tubes has also been used in an effort to clean the aftertreatment device. Such methods have either one or more drawbacks such as being environmentally unfriendly in the case of using solvents, or having the soot and ash removed from the honeycomb tubes being blown around during the air blowing process.

Products have also been made to include a vacuum hose attached to an aftertreatment device cleaning tool that is clamped onto an end of a DOC during an air blowing process to contain the soot and ash removed from the DOC.

However, aftertreatment devices, including DOCs, come in a variety of sizes and shapes. As a result, aftertreatment device technicians are typically required to have a number of different sized cleaning tools to accommodate the various sized DOC products on the market, in order to clamp a particular cleaning tool onto a similarly sized end of the DOC.

As a result, it would be desirable to provide a cleaning tool for use on an aftertreatment device, such as a DOC, that can accommodate various sizes of the ends of a DOC or other aftertreatment device that does not require clamping of the cleaning tool to an end of the aftertreatment device, and that may be used on DOCs that have varying size and shaped ends. Furthermore, it would be desirable to provide a cleaning tool for use on an aftertreatment device that may accommodate a vacuum hose attached to either side of the cleaning tool.

SUMMARY

The present disclosure provides a cleaning tool for cleaning an aftertreatment device. The cleaning tool advantageously includes a concave inner surface that is adapted to be a sealing surface when a vacuum is applied to the cleaning tool. Attached to the concave inner surface is a vacuum attachment port to which an end of a vacuum hose may be secured within or over. When a vacuum hose is secured to the vacuum attachment port, a vacuum seal is created between the concave inner surface and an end of an aftertreatment device, and the cleaning tool remains in place against the end of the aftertreatment device when a vacuum is applied without the need for using a clamp or other fastener to secure the cleaning tool to the aftertreatment device. The concave inner surface provides a sealing surface along its inner surface such that it may advantageously be used on aftertreatment devices having various diameters and sizes.

In addition, in some embodiments, the cleaning tool advantageously allows for the end of a vacuum hose to connect to the vacuum attachment port from either side of the vacuum attachment port. Thus, the end of a vacuum hose may extend through the concave inner surface and into an interior end of the vacuum port attachment, or extend towards the concave inner surface from an exterior end of the vacuum attachment port. To facilitate a secure attachment between the vacuum attachment port and the end of a vacuum hose, an inner surface of the vacuum attachment port may advantageously be tapered from the exterior end thereof towards a central portion of the vacuum attachment port, where the inner surface of the exterior end of the vacuum attachment port has a diameter greater than a central portion of the vacuum attachment port. Similarly, an inner surface of the vacuum attachment port may advantageously be tapered from the interior end thereof towards a central portion of the vacuum attachment port, where the inner surface of the interior end of the vacuum attachment port has a diameter greater than a central portion of the vacuum attachment port.

The present disclosure further provides a cleaning tool kit that includes a plurality of cleaning tools for an aftertreatment device, where the plurality of cleaning tools are of different diameters to accommodate for various diameters and configurations of an end of an aftertreatment device. Although the largest sized diameter concave inner surface of a cleaning tool is adapted to sealingly engage an end of an aftertreatment device of various diameters and sizes, in some cases there are appendages, such as threaded studs, that prevent the use of the largest diameter cleaning tool. As a result, it is desirable to have smaller diameter cleaning tools in the kit to provide for greater versatility in cleaning various sized and shaped ends of an aftertreatment device. Accordingly, the kit may advantageously provide cleaning tools having concave inner surfaces of varying diameters to accommodate the variously shaped and sized ends of an aftertreatment device that may be encountered by a technician.

The present disclosure further provides for a method of cleaning an aftertreatment device using the cleaning tool having the concave inner surface described above.

In one aspect, a cleaning tool for an aftertreatment device is provided with a vacuum attachment port having an exterior end and an interior end and an inner surface positioned between the exterior end and the interior end, a vacuum extension extending from the interior end of the vacuum attachment port, wherein the vacuum extension has a concave inner surface adapted to engage an end of the aftertreatment device; and wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port. It will be appreciated that a single vacuum attachment port could be connected to variously sized vacuum extensions.

In another aspect, a cleaning tool for an aftertreatment device is provided including a vacuum attachment port having an exterior end and an interior end and an inner surface positioned between the exterior end and the interior end; a vacuum extension extending from the interior end of the vacuum attachment port; wherein the vacuum extension has a planar inner surface adapted to engage an end of the aftertreatment device; and wherein the planar inner surface of the vacuum extension is adapted to secure the cleaning tool to the end of the aftertreatment device when a vacuum is applied from the exterior end of the vacuum attachment port by having the planar inner surface provide a vacuum sealing engagement with the end of the aftertreatment device when the vacuum is applied from the exterior end of the vacuum attachment port.

In a further aspect, a kit for cleaning an aftertreatment device is provided including a plurality of cleaning tools, each cleaning tool comprising a vacuum attachment port having an exterior end and an interior end and an inner surface positioned between the exterior end and the interior end, a vacuum extension from the interior end of the vacuum attachment port, wherein the vacuum extension has a concave inner surface adapted to engage an end of the aftertreatment device; and wherein the concave inner surface of the vacuum extension is adapted to secure the cleaning tool to the end of the aftertreatment device when a vacuum is applied from the exterior end of the vacuum attachment port by having the concave inner surface provide a sealing engagement with the end of the aftertreatment when the vacuum is applied from the exterior end of the vacuum attachment port.

Viewed from another aspect, an example embodiment takes the form of a method. The method includes steps of (i) providing a first cleaning tool having a vacuum attachment port with an exterior end and an interior end and an inner surface positioned between the exterior end and the interior end; a vacuum extension extending from the interior end of the vacuum attachment port; wherein the vacuum extension has a concave inner surface adapted to engage an end of the aftertreatment device; and wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port; (ii) securing an end of a vacuum hose to the exterior end of the vacuum attachment port; (iii) positioning the vacuum extension of the first cleaning tool adjacent a first end of the aftertreatment device; (iv) drawing a vacuum through the vacuum hose such that the concave inner surface of the vacuum extension is drawn into vacuum sealing engagement with the first end of the aftertreatment device; and (v) directing a flow of air through a second end of the aftertreatment device towards the vacuum extension of the first cleaning tool. The method may further includes the steps of (vi) ceasing drawing the vacuum from the first end of the aftertreatment device; (vii) removing the vacuum extension of the first cleaning tool from the first end of the aftertreatment device; (viii) positioning the vacuum extension of the first cleaning tool adjacent the second end of the aftertreatment device; (ix) drawing a vacuum through the vacuum hose such that the concave inner surface of the vacuum extension is drawn into vacuum sealing engagement with the second end of the aftertreatment device; and (x) directing a flow of air through the first end of the aftertreatment device towards the vacuum extension of the first cleaning tool.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows perspective and end views of ATD 100', according to an example embodiment.

FIG. 11 is a perspective view of vacuum hose attachment 142 and a cross-sectional view of vacuum hose attachment 142 shown positioned in cleaning tool 200, according to an example embodiment.

FIG. 12 are side views of cleaning tool 200 having vacuum hose attachment 142 positioned within opposite ends of cleaning tool 200, according to an example embodiment.

DETAILED DESCRIPTION

Figure 1:
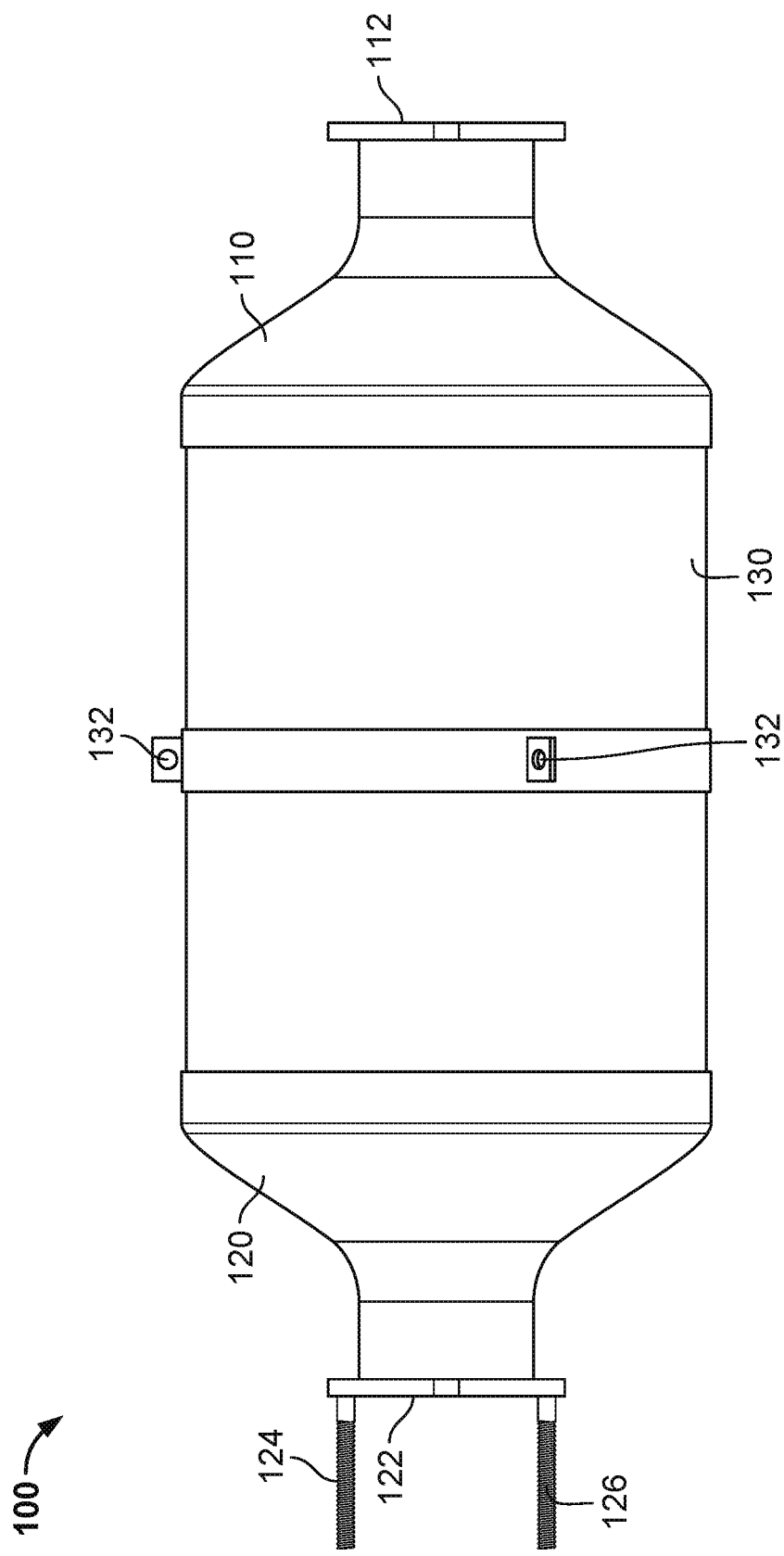
FIG. 1 is a side view of an aftertreatment device (ATD) 100 having a first end 112 and second end 122.

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements can be used instead.

A vehicle is a mobile machine that can be used to transport a person, people, or cargo. Any vehicle described herein can be driven or otherwise guided along a path (e.g., a paved road or otherwise) on land, in water, or in the air. Any vehicle described herein can be wheeled, tracked, railed, or skied. Any vehicle described herein can include an automobile, a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. Any vehicle described herein can include or use any appropriate voltage or current source, such as a battery, an alternator, a fuel cell, and the like, providing any appropriate current or voltage, such as about 12 volts, about 42 volts, or the like. Any vehicle described herein can include or use any desired system(s) or engine(s) to provide its mobility. Those system(s) or engine(s) can include vehicle components that use fossil fuels, such as diesel fuel (e.g., petroleum diesel, synthetic diesel, or biodiesel), gasoline, natural gas, propane, or the like.

FIGS. 1 are 2 are side views of an example ATD 100 that takes the form of a Diesel Oxidation Catalyst (DOC). It includes a main body 130 containing small tubes having a honeycomb cross-section used to convert exhaust gas into $CO_2$ and $H_2O$, and to trap ash and soot. ATD 100 includes a first mounting extension 110 having end 112 and a second mounting extension 120 having end 122, as well as threaded mounting studs 124 and 126. ATD 100 is typically installed in an exhaust gas line connected to an engine (e.g., an engine in a vehicle or an engine operating at a fixed location). Exhaust gas from the engine passes through the honeycomb tubes within main body 130.

Mounting extensions 110, 120 and ends 112 and 122, as well as threaded mounting studs 124, 126 are used to mount ATD 100 to a vehicle. Also shown positioned around main body 130 is a band having tabs with apertures 132. ATD 100 is one example of an "aftertreatment device" which, as noted above, also includes other devices used in an exhaust gas line such a Diesel Particulate Filter (DPF), a Selective Catalyst Reduction (SCR) filter, and a catalytic converter.

The cleaning tools described below are shown in connection with a DOC for illustrative purposes, although it will be appreciated that the cleaning tools may be used with any aftertreatment device.

Figure 2:
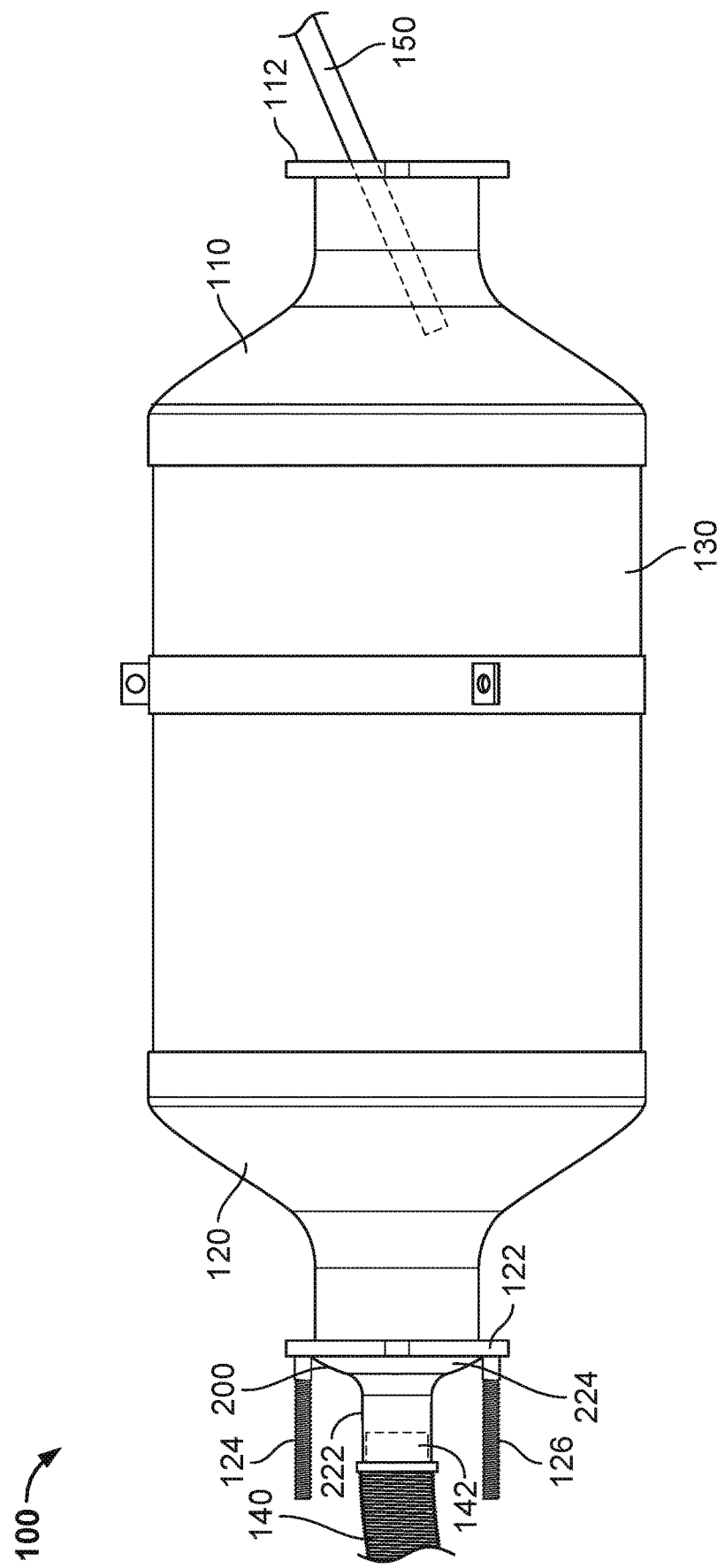
FIG. 2 is a side view of ATD 100 shown in FIG. 1, with a cleaning tool 200 positioned in vacuum sealing engagement with second end 122, and compressed air nozzle 150 shown positioned within first end 112, according to an example embodiment.

FIG. 2 shows cleaning tool 200 positioned between threaded mounting studs 124, 126 on end 122 of mounting extension 120. Cleaning tool 200 includes a vacuum extension 224 and a vacuum attachment port 222 that is secured to vacuum adapter 142 which is in turn attached to vacuum hose 140. When a vacuum is pulled through vacuum hose 140, the vacuum extension 224 becomes vacuum sealingly engaged with end 122 of mounting extension 120. In this manner, the cleaning tool 200 is secured to end 122 of ATD 100 without the need for any clamps or fasteners because it secured by a vacuum being pulled through vacuum hose 140. As used herein, the term "vacuum sealing engagement" means that a vacuum pulled through the vacuum attachment port provides for the vacuum extension of the cleaning tool to be secured to an end of an aftertreatment device with a vacuum, without the need for clamps or other fasteners.

Also shown in FIG. 2 is a compressed air nozzle 150 which directs a flow of air through the honeycomb structure of the main body 130 of ATD 100 to remove soot and ash and other debris from within or on the honeycomb structure. The soot and ash is sucked through vacuum hose 140 to a shop vac, or other debris receptacle.

Figure 3:
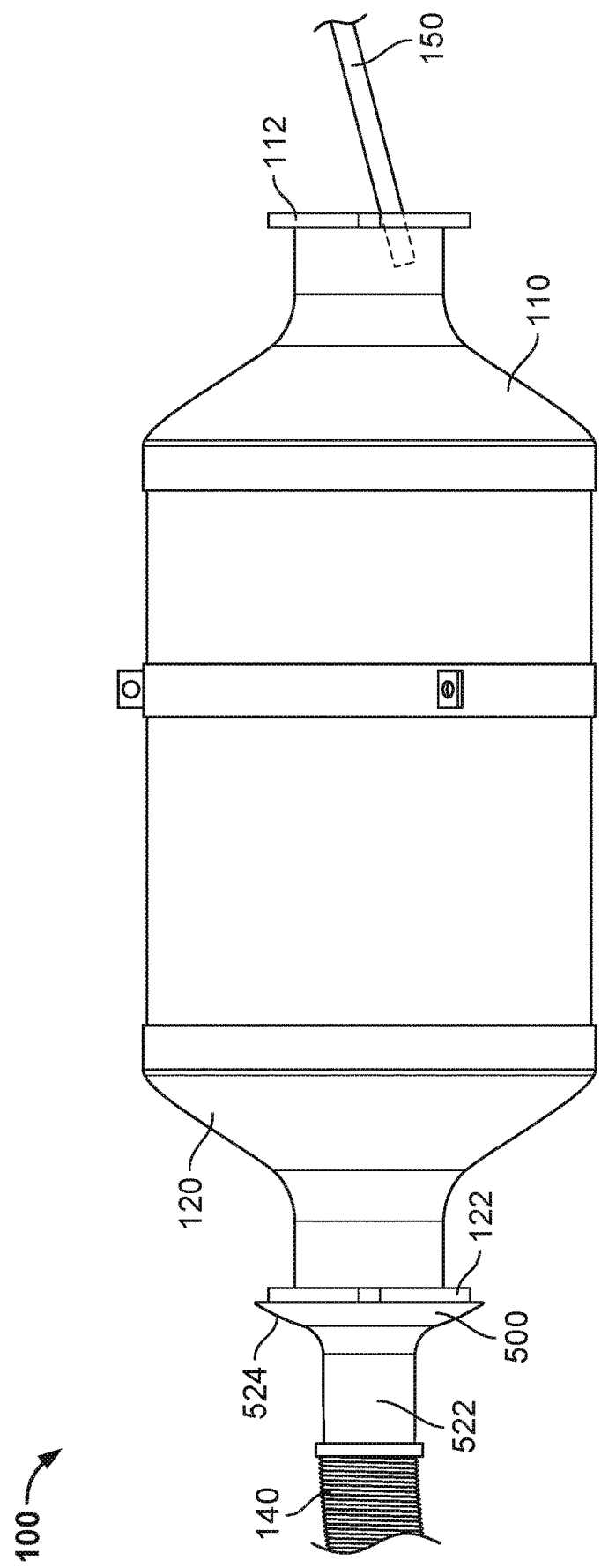
FIG. 3 is a another side view of ATD 100 shown in FIGS. 1 and 2 without threaded studs 124, 126, with a cleaning tool 500 positioned in vacuum sealing engagement with second end 122, and compressed air nozzle 150 shown positioned within first end 112, according to an example embodiment.

FIG. 3 shows ATD 100 shown in FIGS. 1 and 2 with threaded studs 224, 226 removed. In FIG. 3, a larger diameter cleaning tool 500 is shown secured to end 122 of mounting extension 120 by use of a vacuum pulled through vacuum hose 140 that is attached to vacuum attachment port 522 of cleaning tool 500. Cleaning tool 500 has a vacuum extension 524 having a concave inner surface that is in vacuum sealing engagement with end 122 of mounting extension 120 when a vacuum is pulled through vacuum hose 140, such that cleaning tool 500 is secured to end 122 via a vacuum, without the need for clamps or other fasteners. Similar to FIG. 2, compressed air nozzle 150 extends through end 112 of mounting extension 110 which directs a flow of air through the honeycomb structure of main body 130 of ATD 100 to remove soot and ash and other debris from within the honeycomb structure.

Although not shown, an additional cleaning tool configured the same as cleaning tools 200 and 500, but having a larger diameter may be used with compressed air nozzle 150. In particular, the compressed air nozzle 150 may be extended through a vacuum attachment port of the cleaning tool and any blowback of debris may be blocked by the vacuum extension of the cleaning tool.

FIG. 4 shows ATD100' which is configured in a similar manner to ATD 100 shown in FIGS. 1-3, but does not having mounting extensions. ATD 100' includes a main body 130' housing tubes having a honeycomb cross section, shown at end 112'.

Figure 5:
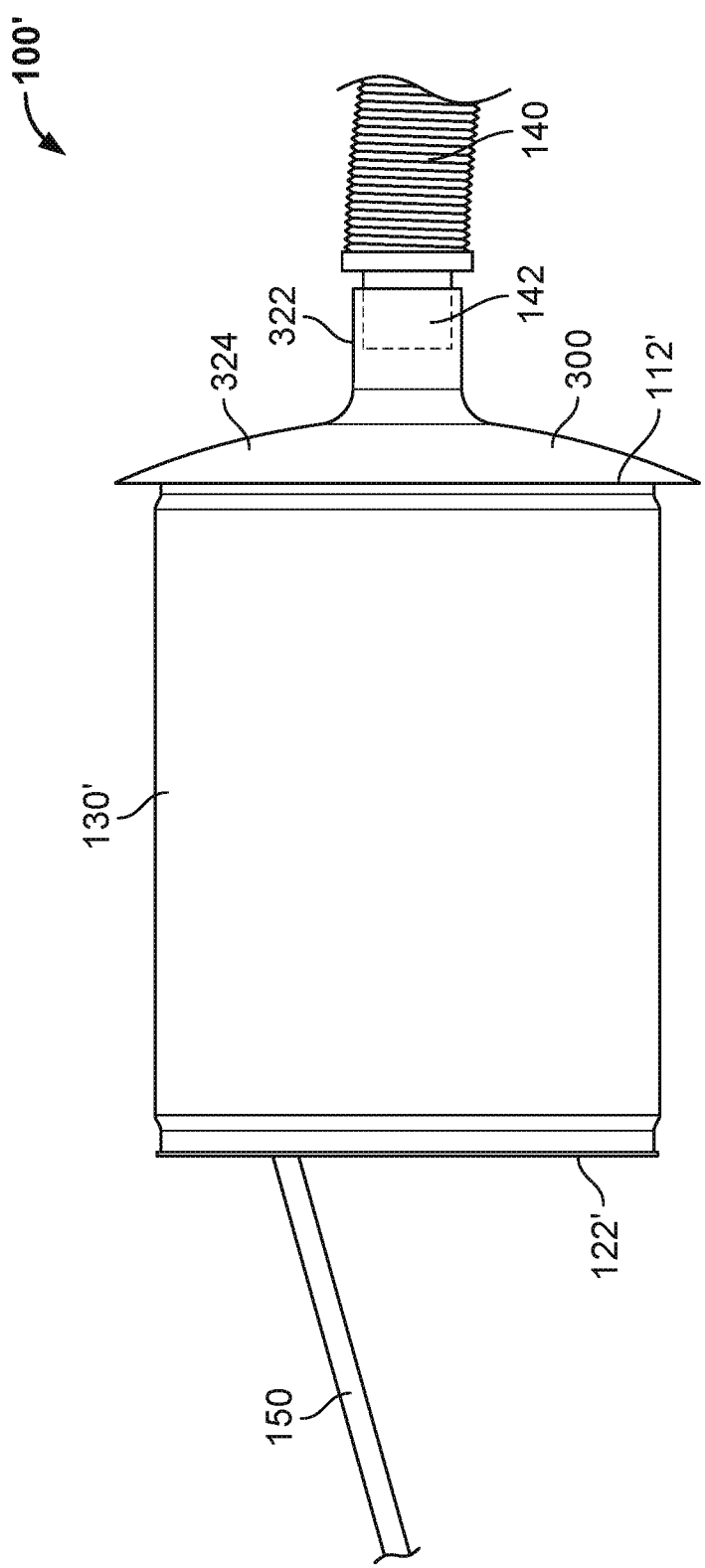
FIG. 5 is a side view of ATD 100' shown in FIG. 4 with cleaning tool 300 in vacuum sealing engagement with end 112' of ATD 100', and with compressed air nozzle positioned in end 122', according to an example embodiment.

FIG. 5 shows ATD 100' with cleaning tool 300 positioned against end 112' of main body 130'. Cleaning tool 300 includes a vacuum attachment port 322 with vacuum adapter 142 positioned therein, which is in turn attached to vacuum hose 140. A vacuum is pulled through vacuum hose 140 such that vacuum extension 324 of cleaning tool 300 is pulled into a vacuum sealing engagement with end 112' of ATD 100'. On the opposite end 122', a compressed air nozzle 150 is used to direct a flow of air through the honeycomb structure of main body 130' to dislodge soot and ash and other debris from within or on the honeycomb structure. The dislodged soot and end is vacuumed through vacuum hose 150 into a shop vac, or other debris receptacle to clean the ATD 100'.

Figure 6:
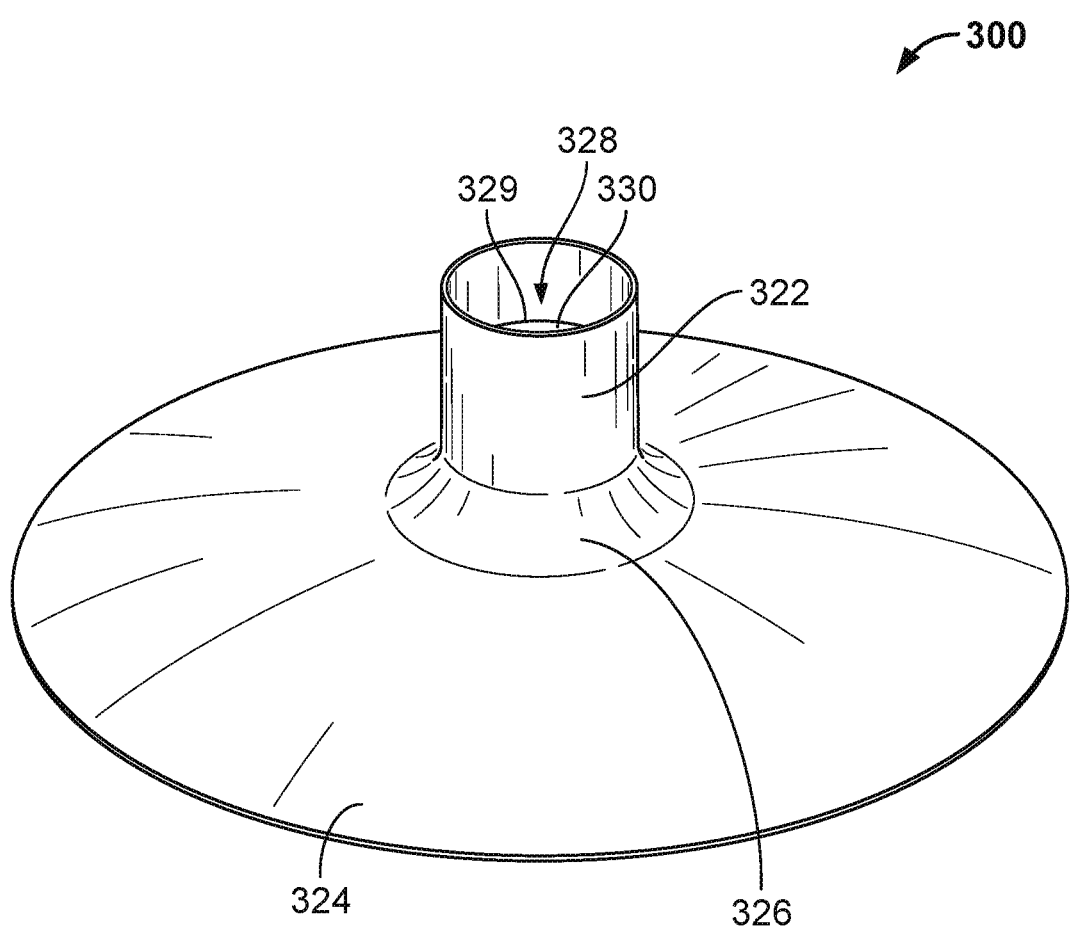
FIG. 6 is a perspective view of cleaning tool 300, according to an example embodiment.

FIG. 6 is a perspective view of cleaning tool 300. Cleaning Tool 300 is shown in FIGS. 1-8 in U.S. patent application Ser. No. 29/614,421, entitled "Vehicle Exhaust Aftertreatment Device Cleaning Tool" filed on Aug. 18, 2017. U.S. patent application Ser. No. 29/614,421 is incorporated by reference herein in its entirety. Cleaning tool 300 includes a vacuum extension 324 having a concave inner surface that is used for vacuum sealing engagement with an end of an aftertreatment device. Vacuum extension 324 extends inwardly until it merges into convex transition section 326 which in turn leads to vacuum attachment port 322. Vacuum attachment port 322 has tapered inner surface 328 that tapers inwardly toward a central portion 329 having a smaller diameter than the top of tapered inner surface 328, and inner surface 330 that tapers inwardly from transition section 326. Another embodiment of a cleaning tool is shown in FIGS. 9-16 in U.S. patent application Ser. No. 29/614,421.

Figure 7:
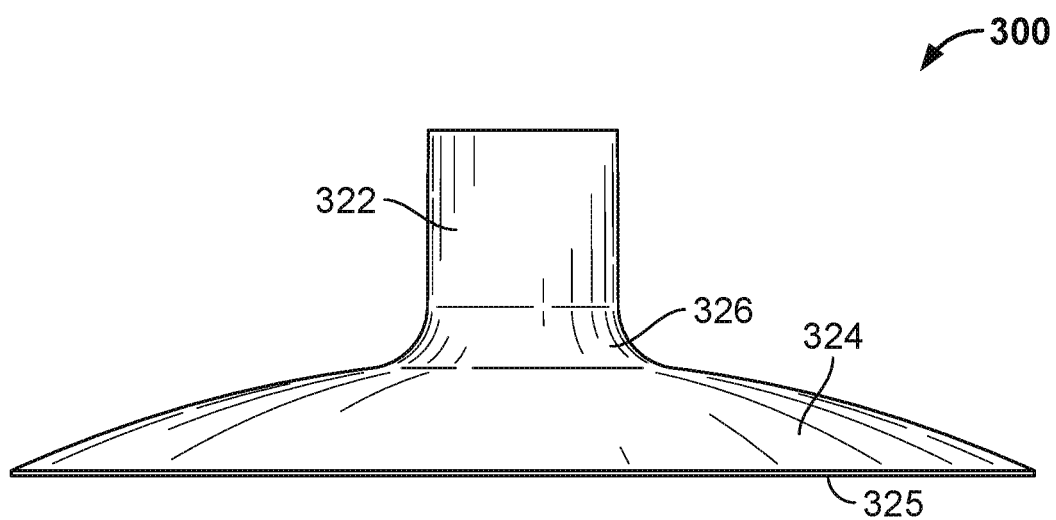
FIG. 7 is a side view of cleaning tool 300 shown in FIG. 6.

FIG. 7 is a side view of cleaning tool 300 shown in FIG. 6. Cleaning tool 300 has an outer edge 325 on the far exterior of vacuum extension 324. Vacuum extension 324 merges into convex transition section 326 which in turn leads to vacuum attachment port 322.

Figure 8:
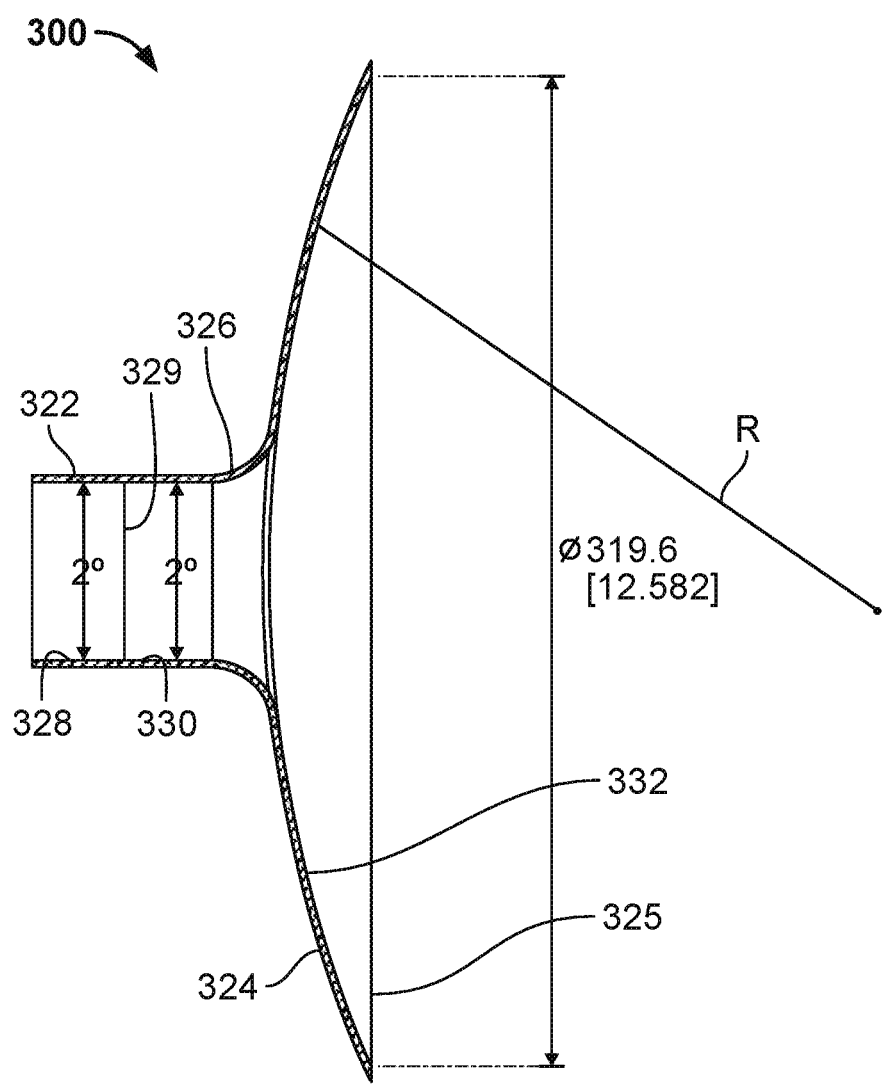
FIG. 8 is a cross-sectional view of cleaning tool 300 shown in FIGS. 6 and 7.

FIG. 8 is a cross-sectional view of cleaning tool 300 shown in FIGS. 6 and 7. Cleaning tool includes vacuum extension 324 that merges into convex transition section 326 which in turn merges into vacuum attachment port 322. Vacuum extension 324 includes an exterior 325 that is planar, and a concave inner surface 332 that serves as a sealing surface for vacuum sealing engagement with an end of an aftertreatment device. Concave inner surface 332 may have a constant radius of 15.5 inches, or 14-17 inches. Cleaning tool 300 may have a nominal diameter of 13 inches, or 13 inches +/− one inch. Vacuum attachment port 322 may have an inner surface 328 that tapers inwardly from an exterior end thereof towards central portion 329, which in some embodiments may be tapered at an angle of about 2 degrees. Similarly, an interior end of vacuum attachment port 322 may taper inwardly towards central portion 329, which in some embodiments may be tapered at an angle of about 2 degrees. The tapered surfaces 328 and 330 facilitate securing a vacuum adapter to the vacuum attachment port 322 from both the exterior and interior sides thereof. It will also be appreciated that an outer surface of vacuum attachment port 322 may taper outwardly from an exterior end thereof to accommodate a fit of a vacuum adapter that fits over the outside of vacuum attachment port 322.

Figure 9:
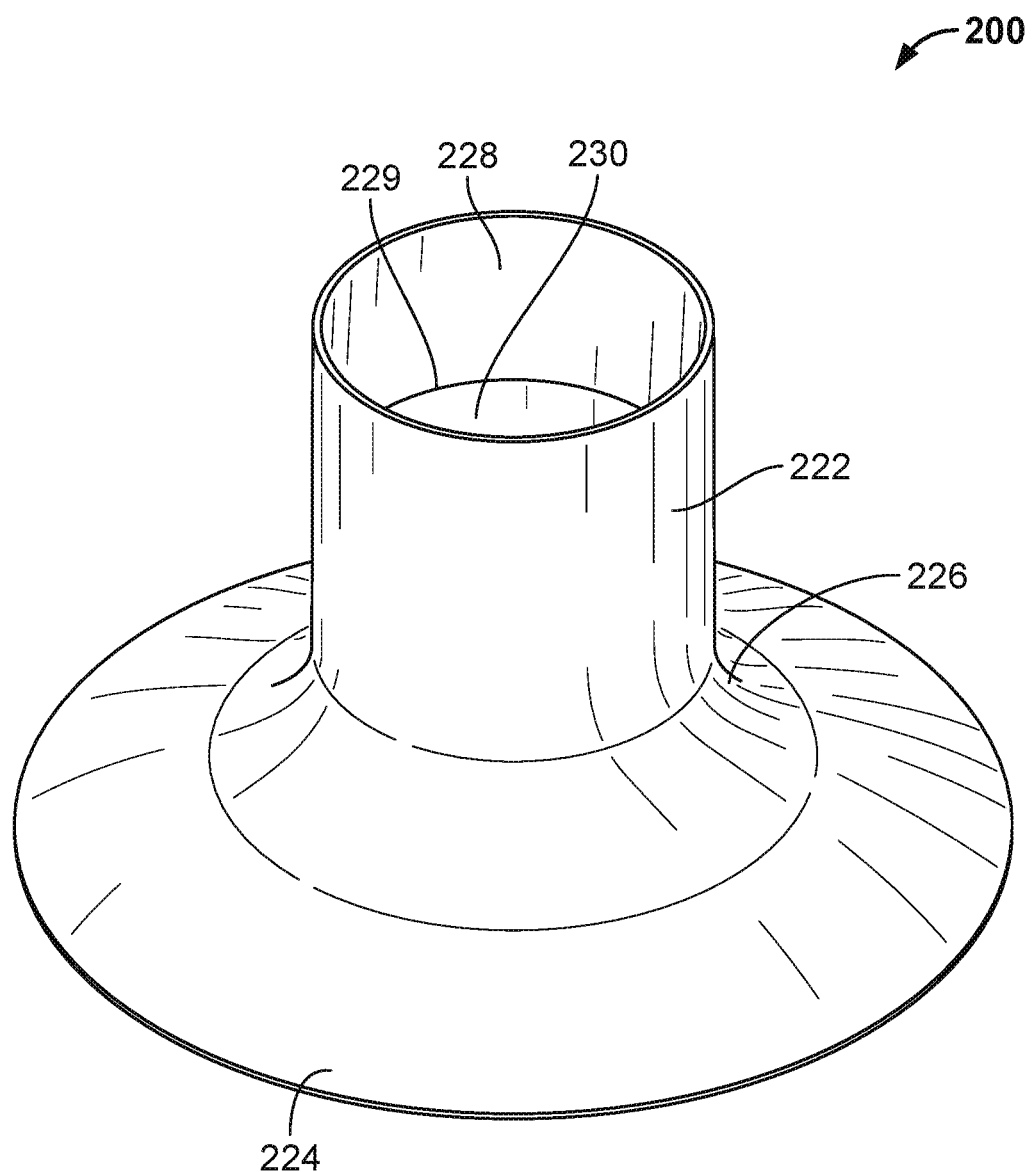
FIG. 9 is a perspective view of cleaning tool 200, according to an example embodiment.

FIG. 9 is a perspective view of cleaning tool 200. Cleaning Tool 200 is shown in FIGS. 1-8 in U.S. patent application Ser. No. 29/614,433, entitled "Vehicle Exhaust Aftertreatment Device Cleaning Tool" filed on Aug. 18, 2017. U.S. patent application Ser. No. 29/614,433 is incorporated by reference herein in its entirety. Cleaning tool 200 includes a vacuum extension 224 having a concave inner surface that is used for vacuum sealing engagement with an end of an aftertreatment device. The concave inner surface of cleaning tool 200 is similar to concave inner surface 332 shown in FIG. 8, although with a smaller diameter. Vacuum extension 224 extends inwardly until it merges into convex transition section 226 which in turn leads to vacuum attachment port 222. Vacuum attachment port 222 has tapered inner surface 228 that tapers inwardly toward a central portion 229 having a smaller diameter than the top of tapered inner surface 228, and inner surface 230 that tapers outwardly towards the transition section 226. Another embodiment of a cleaning tool is shown in FIGS. 9-16 in U.S. patent application Ser. No. 29/614,433.

Figure 10:
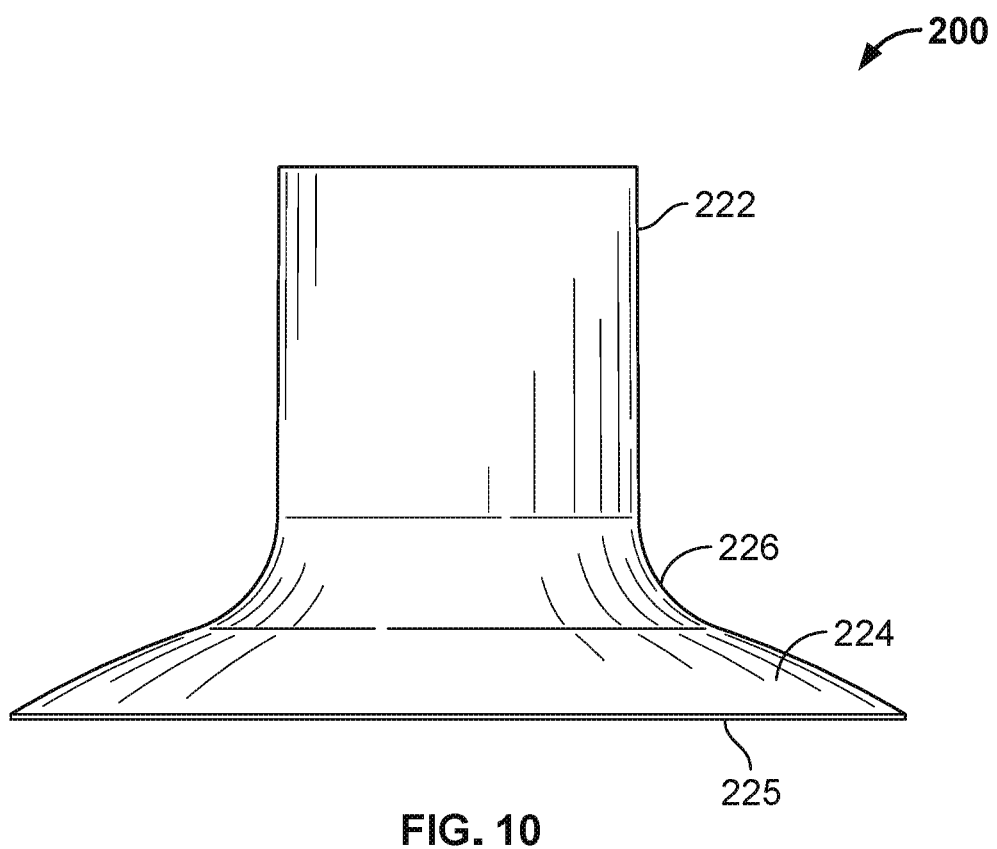
FIG. 10 is a side view of cleaning tool 200 shown in FIG. 9.

FIG. 10 is a side view of cleaning tool 200 shown in FIG. 9. Cleaning tool 200 has an outer edge 225 on the far exterior of vacuum extension 224. Vacuum extension 224 merges into convex transition section 226 which in turn leads to vacuum attachment port 222. In this embodiment, vacuum extension 224 has a nominal diameter of 6 inches, or 6 inches +/− an inch.

FIG. 11 shows a perspective view of vacuum adapter 142 which is adapted for attachment to a vacuum hose and an end adapted for being secured within a vacuum attachment port. Vacuum hoses and adapters may come in various diameters, although a 2-inch diameter is common. However, if a larger or smaller diameter vacuum adapter is being used, the inner diameter of the vacuum attachment port of the cleaning tool may be adjusted to accommodate the particular diameter vacuum adapter being used. FIG. 11 also shows a cross-sectional view of vacuum adapter 142 positioned within the exterior end of vacuum attachment port 222 as well as the interior end of vacuum attachment port 222.

FIG. 12 shows side views of cleaning tool 200 secured to vacuum adapter 142 which is in turn attached to vacuum hose 140. In the upper view, vacuum adapter 142 is inserted through an exterior end of vacuum attachment port 222 of cleaning tool 200, leaving vacuum extension 224 free for eventual vacuum sealing engagement with an end of an aftertreatment device. In the lower view, vacuum adapter 142 is inserted through vacuum extension 224 and through an interior end of vacuum attachment port 222 of cleaning tool 200. This configuration may be useful where there is limited space adjacent an end of an aftertreatment device, such as where studs are placed closely together such that the vacuum extension 224 is unable to fit therebetween. In that scenario, the exterior end of the vacuum attachment port 222 may be pushed against the end of the aftertreatment device and serve to vacuum up debris dislodged from the opposite end of the aftertreatment device as a flow of compressed air is forced through the honeycomb structure of the aftertreatment device.

Figure 13:
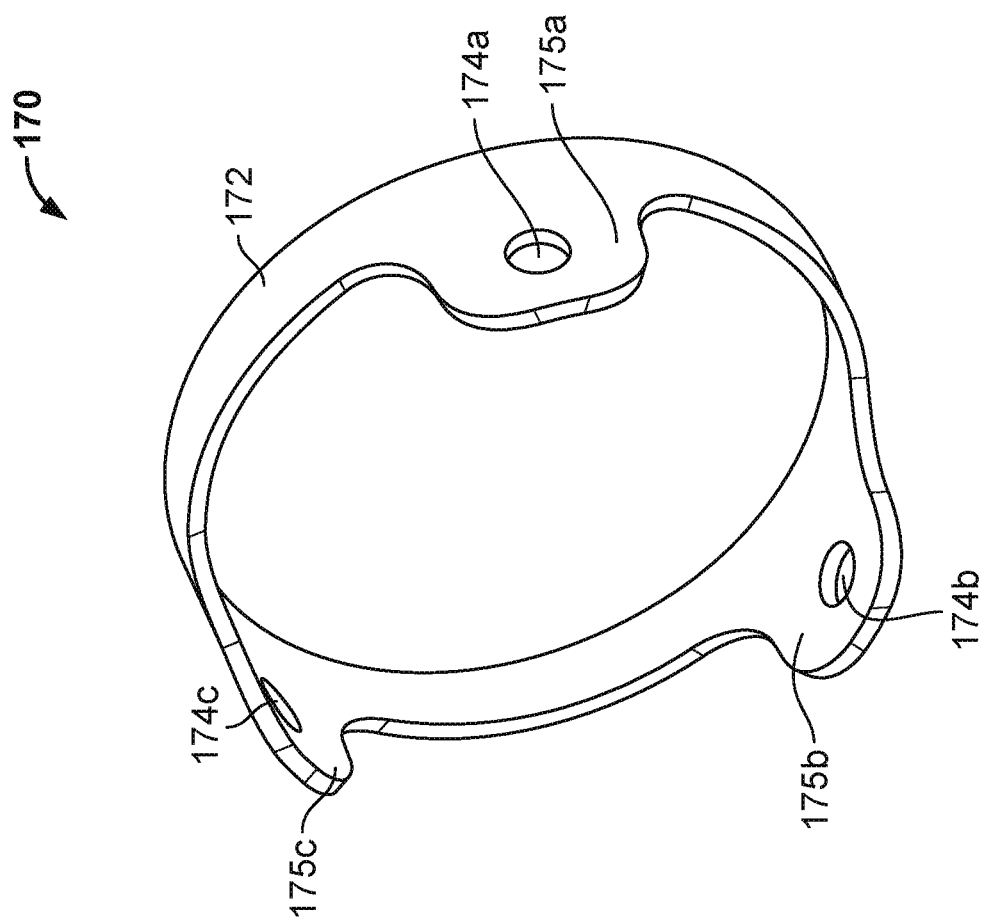
FIG. 13 is a perspective view of retention collar 170, according to an example embodiment.

FIG. 13 is a perspective view of retention collar 170. Retention collar 170 has circular ring 172 having upwardly extending tabs 175a-c, each having an aperture 174a-c. Retention collar 170 is used to generally retain a cleaning tool adjacent an end of an aftertreatment device prior to a vacuum being drawn. In operation, circular ring 172 is sized to be placed over the outer surface of a vacuum attachment port of a cleaning tool. One or more lanyards may be attached to the apertures 174a-c of tabs 175a-c at one end, and the other end of the lanyards may be attached to the main body of the aftertreatment device. In this manner, the cleaning tool is positioned adjacent the end of the aftertreatment device, and once a vacuum is drawn through a vacuum hose, the vacuum extension of the cleaning tool may be drawn into vacuum sealing engagement with the end of the aftertreatment device, at which point the lanyard(s) may be removed, if desired. The retention collar 170 may have other configurations as well. The lanyard may be made of an elastic material, such as stretchable material referred to sometimes as a bungee cord, and the ends may be made of a metal or plastic material.

Figure 14:
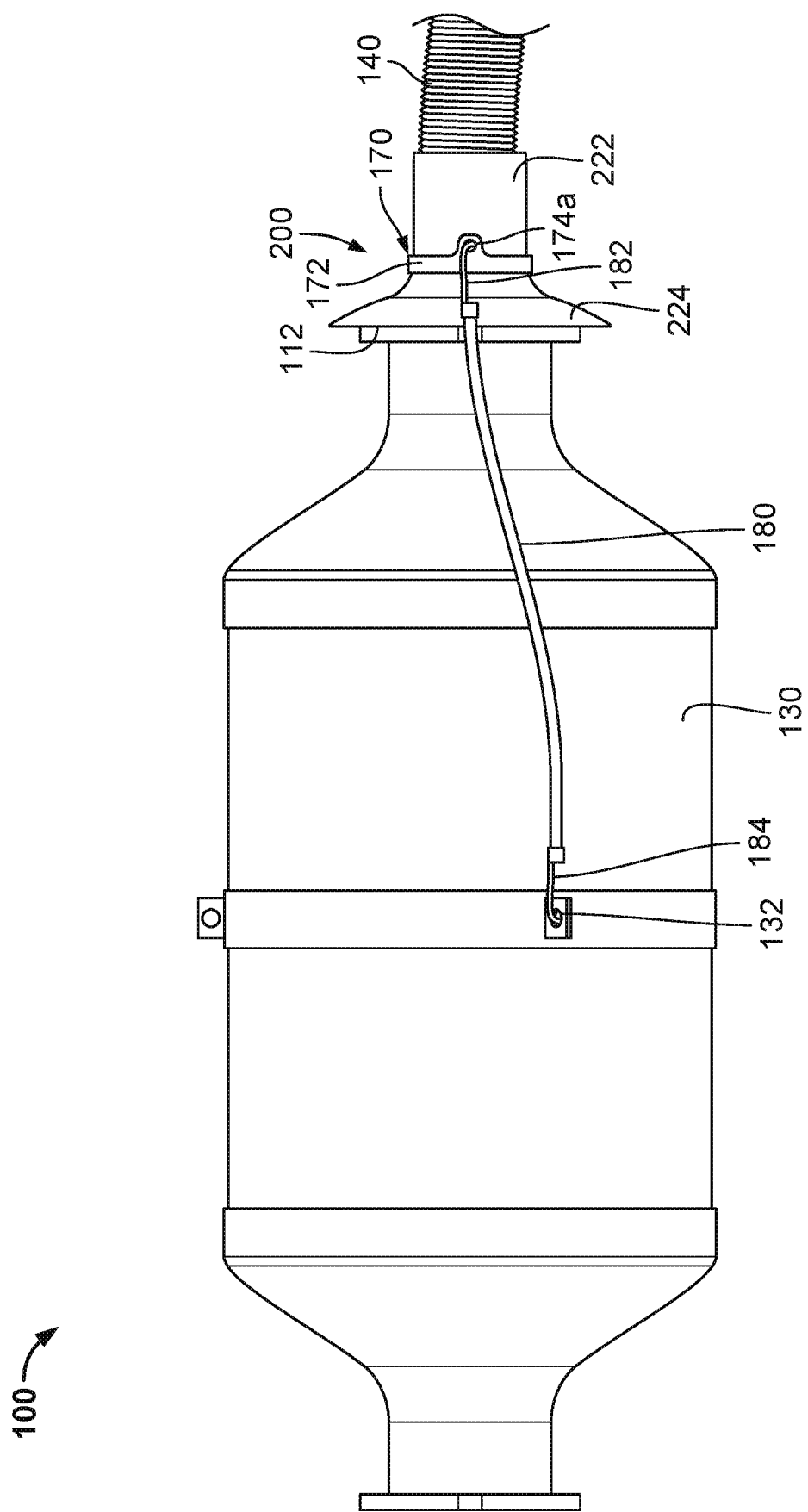
FIG. 14 is a side view of ATD 100 shown with lanyard 180 attached to retention collar 170 and outer body 130 of ATD100, according to an example embodiment.

FIG. 14 is a side view depicting the use of retention collar 170 with circular ring 172 positioned over an outer surface of vacuum attachment port 222 of cleaning tool 200. A lanyard 180 has a first end 182 secured to aperture 174a and a second end 184 attached to aperture 132 positioned above an outer surface of main body 130 of ATD 100. In FIG. 14, a vacuum has been drawn through vacuum hose 140 to draw vacuum extension 224 into vacuum sealing engagement with end 112 of ATD 100. In other embodiments, a plurality of lanyards could be secured to the body of the ATD 100 and to the collar 170 to position the cleaning tool into an abutting engagement with the end of ATD 100.

Figure 15:
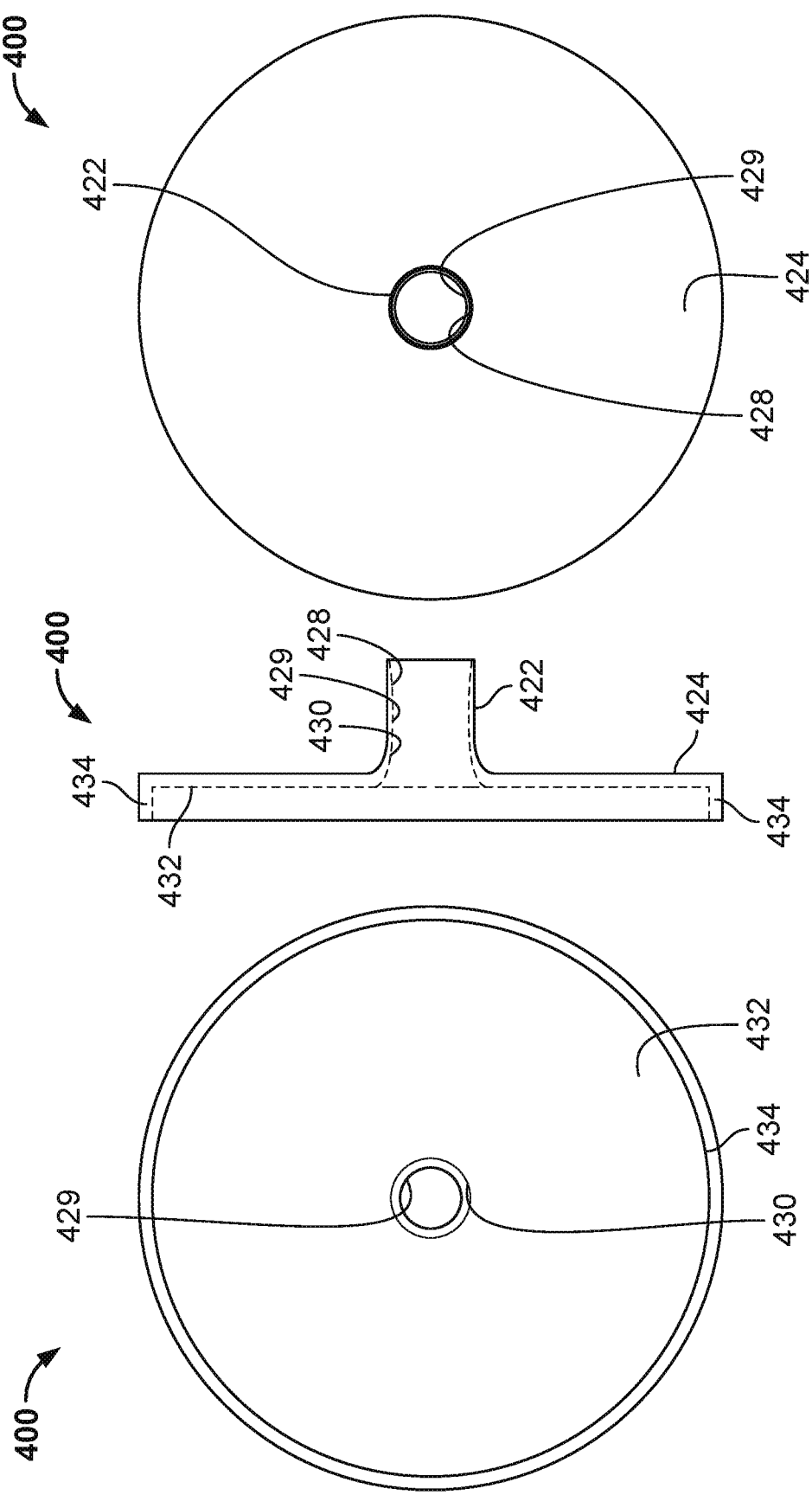
FIG. 15 shows a bottom, top, and cross-sectional view of cleaning tool 400.

FIG. 15 shows a top, bottom, and cross-sectional view of cleaning tool 400. Cleaning tool 400 includes a vacuum attachment port 422 that is attached to a vacuum extension 424. Vacuum extension 424 includes a planar, rather than concave, inner sealing surface 432. Vacuum extension 424 may include forwardly extending outer ridge 434. Vacuum attachment port 424 includes a tapered inner surface. In particular, inner surface 428 tapers inwardly from an exterior end of the vacuum attachment port 424 towards a central portion 429. In addition, inner surface 430 tapers inwardly from an interior end of the vacuum attachment port 424 towards central portion 429. The tapered surfaces 428, 430 are adapted to receive a vacuum adapter which may be attached to either the exterior end or interior end of the vacuum attachment port 424. Inner sealing surface 432 may have a nominal diameter of between 6 and 13 inches.

Figure 16:
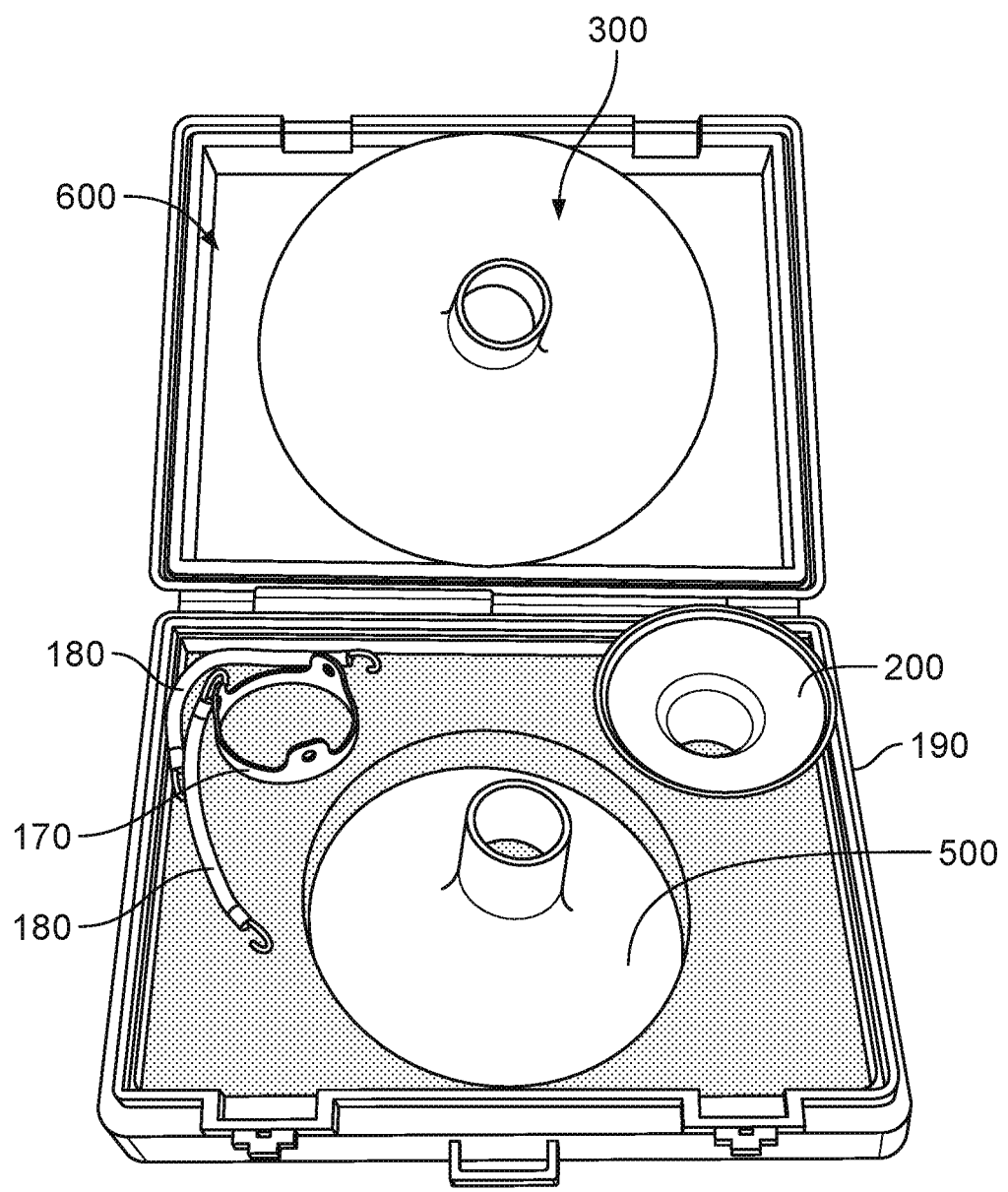
FIG. 16 is a perspective view of cleaning tool kit 600 having cleaning tools, 200, 300, and 500; as well as lanyards 180 and retention collar 170 positioned therein, according to an example embodiment.

FIG. 16 is a perspective view of a cleaning tool kit 600. Cleaning tool kit 600 includes a plurality of different sized cleaning tools. In the embodiment of FIG. 16, cleaning tool kit 600 includes cleaning tools 200, 300, and 500, having a nominal diameter of 6 inches, 13 inches, and 9.5 inches, respectively. The different sized cleaning tools in cleaning tool kit 600 provide a flexible, universal set of cleaning tools that can be used to clean aftertreatment devices of varying sizes and configurations. As a result, cleaning technicians have the cleaning tools at their disposal in a single cleaning tool kit to handle the variously sized aftertreatment devices that they may encounter.

Cleaning tool kit 600 may further include retention collar 170 and lanyards 180, the use of which is described above. Cleaning kit 600 may include a carrier 190 designed to house the plurality of cleaning tools 200, 300, and 500, retention collar 170, and lanyards 180. In addition, other cleaning tools, such as cleaning tool 400, could also be included as a replacement for, or in addition to, the cleaning tools in cleaning tool kit 600.

Cleaning tools 200, 300, 400, and 500 may be made of plastic material such as high density polyethylene, or a plastic similar to a vacuum cleaner attachment plastic, but with some degree of flexibility. The adapter could be made via injection molding to allow for making cleaning tools in large quantities.

Figure 17:
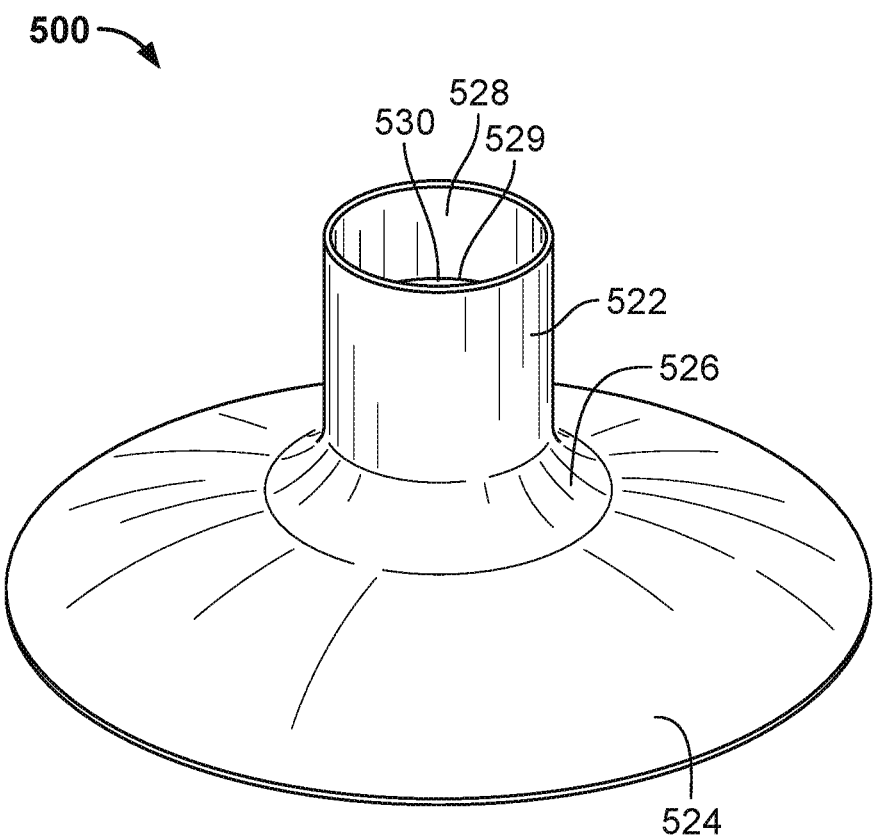
FIG. 17 is a perspective view of cleaning tool 500, according to an example embodiment.

FIG. 17 is a perspective view of cleaning tool 500 shown in cleaning tool kit 600 shown in FIG. 16. Cleaning Tool 500 is shown in FIGS. 1-8 in U.S. patent application Ser. No. 29/614,482, entitled "Vehicle Exhaust Aftertreatment Device Cleaning Tool" filed on Aug. 18, 2017. U.S. patent application Ser. No. 29/614,482 is incorporated by reference herein in its entirety. Cleaning tool 500 includes a vacuum extension 524 having a concave inner surface that is used for vacuum sealing engagement with an end of an aftertreatment device. The concave inner surface of cleaning tool 500 is similar to concave inner surface 332 shown in FIG. 8, although with a smaller diameter. Vacuum extension 524 extends inwardly until it merges into convex transition section 526 which in turn leads to vacuum attachment port 522. Vacuum attachment port 522 has tapered inner surface 528 that tapers inwardly toward a central portion 529 having a smaller diameter than the top of tapered inner surface 528, and inner surface 530 that tapers inwardly from transition section 526 in large quantities. Another embodiment of a cleaning tool is shown in FIGS. 9-16 in U.S. patent application Ser. No. 29/614,482.

Figure 18:
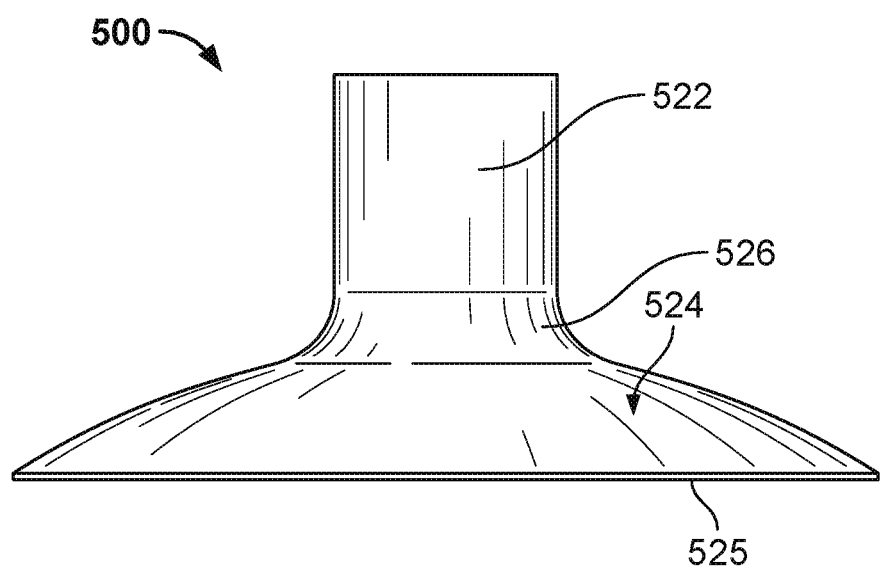
FIG. 18 is a side view of cleaning tool 500 shown in FIG. 17.

FIG. 18 is a side view of cleaning tool 500 shown in FIG. 17. Cleaning tool 500 has an outer edge 525 on the far exterior of vacuum extension 524. Vacuum extension 524 merges into convex transition section 526 which in turn leads to vacuum attachment port 522. Cleaning tool 500 may have a vacuum extension 524 with a nominal diameter of 9.5 inches.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting. In addition, the cleaning tools described herein may be used while the ATD is connected to an engine (on-board a vehicle), or not connected to an engine (off-board a vehicle).

What is claimed is:

1. A cleaning tool for an aftertreatment device, comprising:
   a vacuum attachment port having an exterior end and an interior end and an inner surface positioned between the exterior end and the interior end;
   a vacuum extension extending from the interior end of the vacuum attachment port;
   wherein the vacuum extension has a concave inner surface adapted to engage an end of the aftertreatment device;
   wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port;
   wherein the vacuum attachment port is adapted to receive and secure an end of a vacuum hose on the exterior end thereof; and
   wherein the inner surface of the vacuum attachment port is tapered inwardly from the exterior end thereof towards a central portion of the vacuum attachment port, and the inner surface of the vacuum attachment port is tapered inwardly from the interior end thereof towards the central portion of the vacuum attachment port.

2. The cleaning tool of claim 1, wherein a transition section having a convex inner surface is positioned between the vacuum attachment port and the vacuum extension.

3. The cleaning tool of claim 2, wherein the concave inner surface includes a constant radius portion extending from an outer end of the vacuum extension to the transition section.

4. The cleaning tool of claim 3, where the constant radius is between 14 and 17 inches, inclusive.

5. The cleaning tool of claim 1, wherein the concave inner surface has a diameter of over 12 inches.

6. The cleaning tool of claim 1, wherein an outside surface of the vacuum attachment port is tapered outwardly from the exterior end of the vacuum attachment port towards the interior end of the vacuum attachment port.

7. The cleaning tool of claim 1, wherein the vacuum extension is made of a flexible, plastic material.

8. The Cleaning tool of claim 1, further including a collar positionable over an outside surface of the vacuum attachment port; wherein the collar has one or more apertures adapted for attachment to a first end of a lanyard; and wherein the lanyard has a second end adapted for attachment to the aftertreatment device.

9. The cleaning tool of claim 1, wherein the inner concave surface is adapted for vacuum sealing engagement with an end of the aftertreatment device having varying diameters.

10. The cleaning tool of claim 1, wherein the inner concave surface extends from an end of the vacuum extension to a transition section that extends to the vacuum attachment port.

11. A cleaning tool for an aftertreatment device, comprising:
    a vacuum attachment port having an exterior end and an interior end and an inner surface positioned between the exterior end and the interior end;
    a vacuum extension extending from the interior end of the vacuum attachment port;
    wherein the vacuum extension has a concave inner surface adapted to engage an end of the aftertreatment device;
    wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port;
    wherein the vacuum attachment port is adapted to receive and secure an end of a vacuum hose on the exterior end and on the interior end thereof; and
    wherein the inner surface of the vacuum attachment port is tapered inwardly from the exterior end thereof towards a central portion of the vacuum attachment port, and the inner surface of the vacuum attachment port is tapered inwardly from the interior end thereof towards the central portion of the vacuum attachment port.

12. The cleaning tool of claim 11, wherein the inner surface of the vacuum attachment port is tapered inwardly from the exterior end and the interior end thereof at an angle of 2 degrees.

13. A kit for cleaning an aftertreatment device, comprising:
    a plurality of cleaning tools, each cleaning tool comprising:
        a vacuum attachment port having an exterior end and an interior end and an inner surface positioned between the exterior end and the interior end;
        a vacuum extension extending from the interior end of the vacuum attachment port;
    wherein the vacuum extension of at least two of the plurality of cleaning tools has a concave inner surface adapted to engage an end of the aftertreatment device; and wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment when the vacuum is applied from the exterior end of the vacuum attachment port;
        wherein the vacuum attachment port is adapted to receive and secure an end of a vacuum hose on the exterior end thereof; and
        wherein the inner surface of the vacuum attachment port is tapered inwardly from the exterior end thereof towards a central portion of the vacuum attachment port and the inner surface of the vacuum attachment port is tapered inwardly from the interior end thereof towards the central portion of the vacuum attachment port.

14. The kit of claim 13, wherein each cleaning tool of the plurality of cleaning tools has a different diameter concave inner surface than each of the other cleaning tools in the plurality of cleaning tools.

15. The kit of claim 14, wherein the plurality of cleaning tools comprises three cleaning tools each having a concave inner surface having a diameter different than the other cleaning tools in the kit.

16. The kit of claim 15, wherein the diameter of the concave inner surface of a first cleaning tool is 13 inches+/−1 inch, the diameter of the concave inner surface of a second cleaning tool is 9.5 inches, +/−1 inch, and the diameter of the concave inner surface of a third cleaning tool is 6 inches, +/−1 inch.

17. The kit of claim 13, further including a collar positionable over an outside surface of each of the vacuum attachment ports of the plurality of cleaning tools; wherein the collar has one or more apertures; wherein the kit further includes one or more lanyards; wherein the one or more lanyards each have a first end adapted for attachment to the one or more apertures in the collar and a second end adapted for attachment to the aftertreatment device.

18. The kit of claim 13, wherein at least one of the plurality of cleaning tools has a vacuum extension having a planar inner surface.

19. A method of cleaning an aftertreatment device, comprising:
    (i) providing a first cleaning tool having a vacuum attachment port with an exterior end and an interior end and an inner surface positioned between the exterior end and the interior end; a vacuum extension extending from the interior end of the vacuum attachment port; wherein the vacuum extension has a concave inner surface adapted to engage an end of the aftertreatment device; and wherein the concave inner surface of the vacuum extension is adapted to secure the cleaning tool to the end of the aftertreatment device when a vacuum is applied from the exterior end of the vacuum attachment port by having the concave inner surface provide a vacuum sealing engagement with the end of the aftertreatment device when the vacuum is applied from the exterior end of the vacuum attachment port;

wherein the inner surface of the vacuum attachment port is tapered inwardly from the exterior end thereof towards a central portion of the vacuum attachment port, and the inner surface of the vacuum attachment port is tapered inwardly from the interior end thereof towards the central portion of the vacuum attachment port;

(ii) securing an end of a vacuum hose to the exterior end of the vacuum attachment port;

(iii) positioning the vacuum extension of the first cleaning tool adjacent a first end of the aftertreatment device;

(iv) drawing a vacuum through the vacuum hose such that the concave inner surface of the vacuum extension is drawn into vacuum sealing engagement with the first end of the aftertreatment device; and (v) directing a flow of air through a second end of the aftertreatment device towards the vacuum extension of the first cleaning tool.

20. The method of claim 19, further including the steps of:

(vi) ceasing drawing the vacuum from the first end of the aftertreatment device;

(vii) removing the vacuum extension of the first cleaning tool from the first end of the aftertreatment device;

(viii) positioning the vacuum extension of the first cleaning tool adjacent the second end of the aftertreatment device;

(ix) drawing a vacuum through the vacuum hose such that the concave inner surface of the vacuum extension is drawn into vacuum sealing engagement with the second end of the aftertreatment device; and (x) directing a flow of air through the first end of the aftertreatment device towards the vacuum extension of the first cleaning tool.

21. The method of claim 19, further including the steps of:

(vi) positioning a retention collar having an aperture therein over the vacuum attachment port of the cleaning tool;

(vii) securing a first end of a lanyard to the aperture of the retention collar; and (viii) securing a second end of the lanyard to the aftertreatment device before the step of drawing a vacuum through the vacuum hose.

22. The method of claim 19, wherein the step of directing a flow of air through the second end of the aftertreatment device includes directing the flow of air through a vacuum attachment port of a second cleaning tool having a vacuum attachment port connected to a vacuum extension having a concave inner surface.

23. A cleaning tool for an aftertreatment device, comprising:

a vacuum attachment port having an exterior end and an interior end and an inner surface positioned between the exterior end and the interior end;

a vacuum extension extending from the interior end of the vacuum attachment port;

wherein the vacuum extension has a planar inner surface adapted to engage an end of the aftertreatment device;

wherein the planar inner surface of the vacuum extension is adapted to secure the cleaning tool to the end of the aftertreatment device when a vacuum is applied from the exterior end of the vacuum attachment port by having the planar inner surface provide a vacuum sealing engagement with the end of the aftertreatment device when the vacuum is applied from the exterior end of the vacuum attachment port; and wherein the vacuum attachment port is adapted to receive and secure an end of a vacuum hose on the exterior end thereof; and wherein the inner surface of the vacuum attachment port is tapered inwardly from the exterior end thereof towards a central portion of the vacuum attachment port, and the inner surface of the vacuum attachment port is tapered inwardly from the interior end thereof towards the central portion of the vacuum attachment port.

24. A cleaning tool for an aftertreatment device, comprising:

a vacuum attachment port having an exterior end and an interior end and an inner surface positioned between the exterior end and the interior end;

a vacuum extension extending from the interior end of the vacuum attachment port;

wherein the vacuum extension has an inner surface adapted to engage an end of the aftertreatment device;

wherein the inner surface of the vacuum extension is adapted to secure the cleaning tool to the end of the aftertreatment device when a vacuum is applied from the exterior end of the vacuum attachment port by having the inner surface provide a vacuum sealing engagement with the end of the aftertreatment device when the vacuum is applied from the exterior end of the vacuum attachment port;

wherein the vacuum attachment port is adapted to receive and secure an end of a vacuum hose on the exterior end thereof; and wherein the inner surface of the vacuum attachment port is tapered inwardly from the exterior end thereof towards a central portion of the vacuum attachment port, and the inner surface of the vacuum attachment port is tapered inwardly from the interior end thereof towards the central portion of the vacuum attachment port.

* * * * *